United States Patent [19]
Brown et al.

[11] Patent Number: 4,761,196
[45] Date of Patent: Aug. 2, 1988

[54] METHOD FOR OVERCOMING OPTICAL DEFICIENCIES OF SHOOTERS

[76] Inventors: Hugh L. Brown, 12053 N. Ridge Rd., Mequon, Wis. 53092; Richard J. Stepniewski, 10228 W. Burleigh, Wauwatosa, Wis. 53222

[21] Appl. No.: 44

[22] Filed: Jan. 2, 1987

[51] Int. Cl.⁴ ............................................. B65C 1/02
[52] U.S. Cl. ................................... 156/247; 206/316; 206/579; 351/53; 428/64
[58] Field of Search ............ 428/64, 79; 351/44, 351/45, 53, 57, 46; 272/8 R; 206/316, 579; 156/60, 247, 344

[56] References Cited

U.S. PATENT DOCUMENTS

| | | | |
|---|---|---|---|
| 839,016 | 12/1906 | MacDonald | 351/46 X |
| 2,511,776 | 6/1950 | Kelly | 351/45 X |
| 2,547,487 | 4/1951 | Penney | 156/247 X |
| 2,746,204 | 5/1956 | Karpf | 272/8 R X |
| 2,895,376 | 7/1959 | Linder, Jr. | 351/45 X |
| 3,628,854 | 12/1971 | Jampolsky | 351/45 X |
| 3,704,150 | 11/1972 | Barouh et al. | 428/43 |
| 4,032,679 | 6/1977 | Aoyagi | 428/41 X |
| 4,235,459 | 11/1980 | Callahan | 428/42 X |
| 4,563,065 | 1/1986 | Kreissl | 351/57 X |
| 4,580,360 | 4/1986 | Gribb | 428/42 X |
| 4,623,569 | 11/1986 | Relson | 428/42 |
| 4,648,930 | 3/1987 | LaMers | 156/344 X |

FOREIGN PATENT DOCUMENTS

| 530408 | 9/1956 | Canada | 428/900 X |
|---|---|---|---|
| 1489383 | 6/1967 | France | 351/57 |

Primary Examiner—Henry F. Epstein
Attorney, Agent, or Firm—Fuller, Puerner & Hohenfeldt

[57] ABSTRACT

A thin flexible disk of opaque material and at least one flexible disk comprised of a translucent plastic material is provided in a kit. A shooter aims a weapon such as a rifle in the normal fashion with the optical axis of one eye aligned with the rear and front sights on the rifle. While the rifle is being aimed, the other eye, that is, the eye which is not consciously doing any aiming, has the opaque disk applied to the lens of the shooter's glasses. The opaque disk is then moved around until it is aligned with the pupil and on the optical axis of said other eye. A translucent disk is then applied coincidentally with the opaque disk after which the tentatively adhered opaque disk is removed. The shooter then proceeds to shoot with the center of vision of said other eye blanked out but with diffuse light coming through the translucent disk so the brain governs the other eye as if the eye were operating under ordinary conditions in which case depth perception, peripheral vision and binocular vision are preserved as is normally the case when an object is sighted with two unoccluded eyes.

7 Claims, 1 Drawing Sheet

U.S. Patent
Aug. 2, 1988
4,761,196
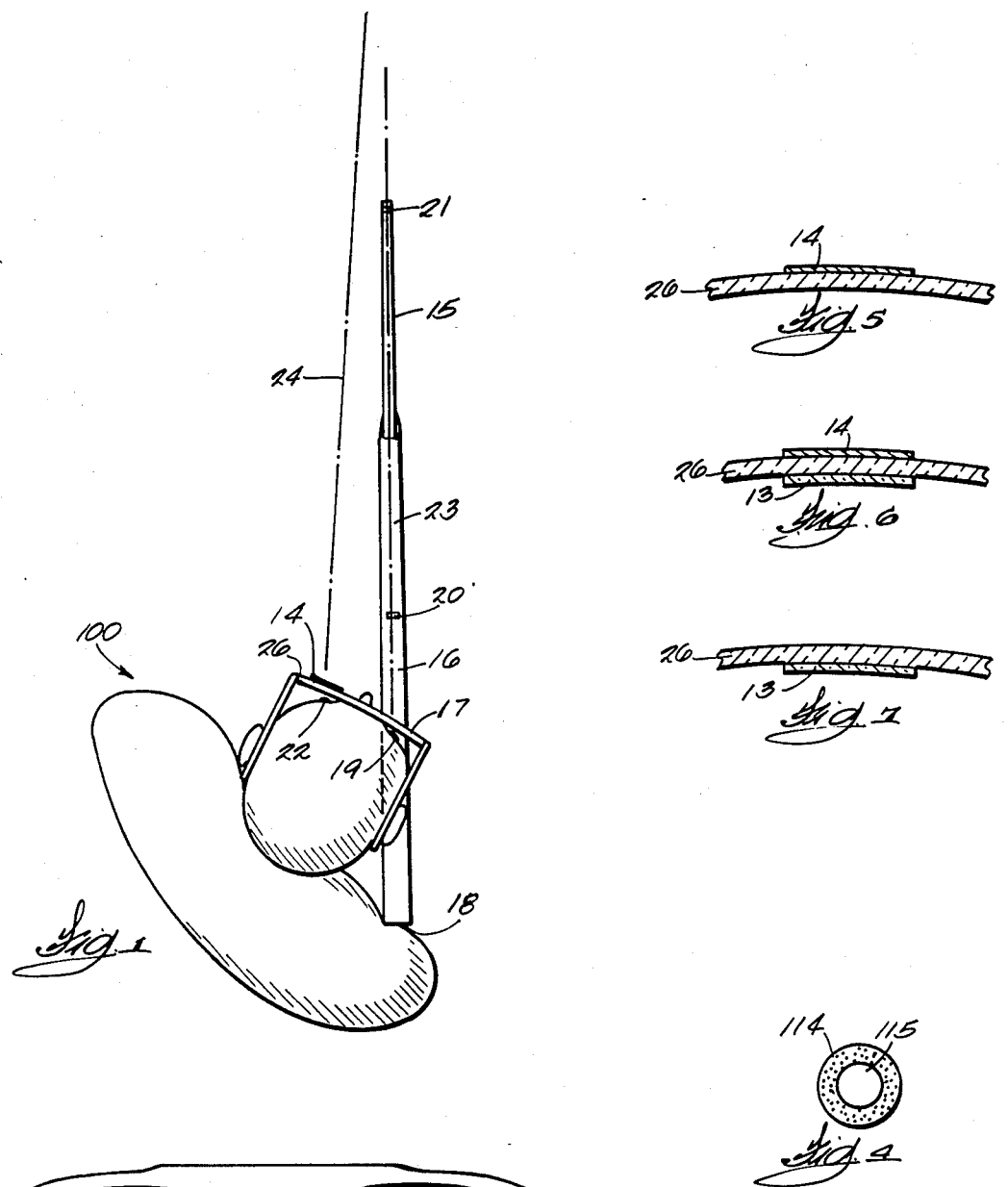
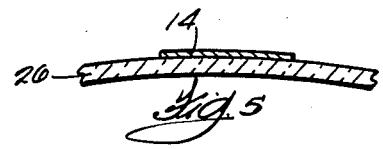
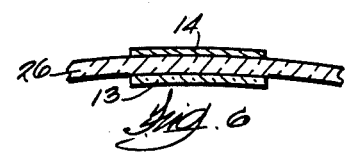
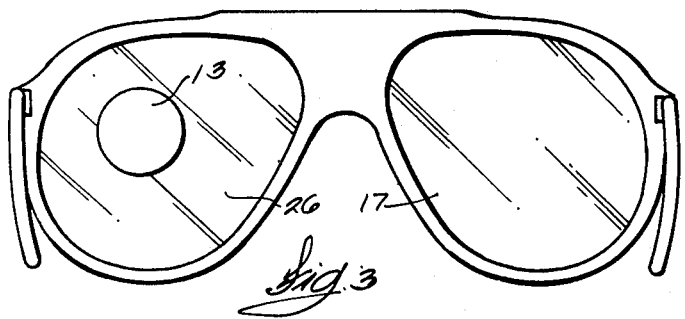
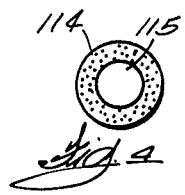
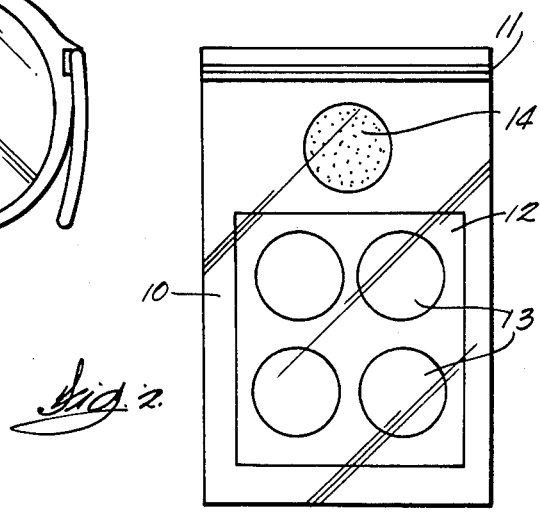

METHOD FOR OVERCOMING OPTICAL DEFICIENCIES OF SHOOTERS

BACKGROUND OF THE INVENTION

This invention pertains to a method and device for improving the accuracy and enhancing the comfort of bow and arrow, rifle, pistol and shotgun shooters. The new device can also serve as an optical aid when performing a function primarily with one eye such as when a person is looking through the eyepiece of an microscope or a telescope or other monocular optical instrument.

In most, if not all cases, if an individual is born right handed, the right eye will be dominant and if born left handed, the left eye will be dominant. In many cases, as soon as left handedness is observed in an infant, the parents will influence the child to use the right hand to conform to the practice of the majority of the population. Thus, a substantial number of individuals who appear to be right handed at maturity are innately left handed. Forcibly changing handedness, however, does not produce a corresponding change in eye dominance so that there are a substantial number of individuals who are cross-dominant. This can be disadvantageous when attempting to perform a function that permits use of only one eye such as in aiming a weapon or looking into a monocular optical instrument. When aiming commonly used weapons such as pistols, shotguns and rifles, the shooter attempts to set the rear and front sights and the target point in alignment. Most rifles and shotguns are designed for use by right handed shooters who will rest the butt of the gun stock against their right shoulder and place their right eye behind the rear sight with the intention of using the right eye exclusively to align the front and rear sights and the target. If the shooter is left eye dominant, the brain influences the left eye to become involved in the sighting and inaccuracy in aiming results. To alleviate this problem to the extent possible, it is common practice for shooters to close the dominant left eye which, of course, results in the brain dictating that the right eye will take control. It is known, particularly among competitive shooters, that shooting with one eye closed has an adverse effect on accuracy. It results in loss of binocular vision, peripheral vision and depth perception. Loss of any one of these qualities will adversely affect the accuracy of trap shooters, target shooters or hunters. It is especially important for trap shooters to maintain peripheral vision and depth perception since a shot is fired when the moving clay pigeon or target comes into sight. The three qualities, however, should be preserved in any kind of shooting with a gun or bow and arrow.

Competitive pistol shooters who shoot at stationary targets are seriously handicapped by cross-dominance between eyes and hands. The competitive pistol shooter usually holds the pistol out with two arms extended at eye level. Even if the pistol shooter keeps both eyes open while aiming as is desirable, unconsciously, the sight and barrel of the pistol will be turned slightly as a result of the burden of alignment being accepted primarily by the dominant eye. Shooting accuracy, therefore, suffers.

It has also been established that closing one eye while letting the other do the work has adverse physiological effects. The capillary bed that supplies the retina tissue to which the optic nerve connects, is beneath the retina so light does not have to pass through blood. When one eye is closed voluntarily or otherwise for a short time, the brain brings about events that result in reduced blood flow to both eyes and this reduces visual acuity of the eye that is open and doing the work. This is another good reason for keeping both eyes open while aiming.

Many individuals among the population including shooters are not aware that their eyes and hands are cross-dominant because they have not become aware that it is easy to make the determination. As is known, a test for which eye is dominant simply involves holding a finger or a pencil, for example, upright with the arm fully extended and with both eyes aligning the pencil with a distant object. Then, the right eye can be closed. If, when the right eye is closed the pencil appears to shift out of alignment with the distant object, it was the right eye that was doing most of the work all the time and there is right eye dominance. The other part of the test is to close the left eye. If there is right eye dominance, then there will be no shift. Conversely, if the individual closes the left eye and a shift occurs, it is an indication of left eye dominance. For additional confirmation, the right eye is closed and there will be no shift if there is left eye dominance.

Some shooters have recognized that they have cross-dominance and they attempt to take measures to mitigate the disadvantage. Some shooters who are left eye dominant have obtained special weapons or, particularly, had a rifle or shotgun stock made that is adaptable for shooting on the left side so that the left dominant eye can be used. Some left eye dominant shooters will shoot with the butt of the gun stock on the right shoulder and use the weaker or non-dominant right eye for aiming while the left eye is covered with a black patch or, if glasses are used, opaque tape is applied to the left lens. When the lens is covered or the eye is completely overlayered with a patch, it is as if one is shooting with the non-dominant eye closed in which case binocular vision, depth perception and peripheral vision are lost. In any case, it has been shown that better shooting accuracy is obtained when a shooter masters keeping both eyes open even if there is no cross-dominance between the eyes and hands. A right eye dominant shooter, for instance, who correctly aims with the right eye and does not need to overcome a problem of cross-dominance is better off if both eyes are kept open when shooting. Some shooters who have no cross-dominance still cannot keep both eyes open because they experience double vision if they do so while aiming. They usually solve this problem by closing the non-dominant eye anyway.

SUMMARY OF THE INVENTION

A primary objective of the invention is to provide a device and method for aiding shooters and others who must perform an aiming or sighting operation with one eye to do so with greater comfort, without adverse physiological effects and above all, with greater accuracy.

A correlative objective is to provide a device and method to obtain maximum accuracy despite using the non-dominant eye for aiming. And, conversely, a further objective is to provide a device and method for allowing a shooter who properly uses his or her dominant eye for aiming a gun to keep the other eye open to preserve substantially normal peripheral vision, binocular vision and depth perception.

Briefly stated, the device is a kit that contains a thin opaque pupil alignment disk and at least one thin translucent flexible plastic disk of comparable diameter which has a coating of pressure sensitive adhesive for adhering it to the lens of the shooter's glasses in the front of the eye which is not consciously used for aiming. The disk with the adhesive is preferably tinted to match the tint of the user's glasses and it is also thin enough to be translucent to thereby permit transmission of some light, but no image directly along the optic axis of the eye lens.

The method of using the kit for one who is left eye dominant, for example, but is compelled to use a gun that is adapted for right eye dominant and right handed shooters is to have the shooter hold the gun in normal aiming position. Thus, the optical axis of the right eye will be aligned with the gun sights. The opaque disk from the kit is then deposited on the outside of the lens or glass covering the left eye. The disk can be made to adhere tentatively to the left lens by wetting the disk and placing it on the lens. While in aiming attitude, the opaque aligning disk is moved around on the left lens until it aligns with the pupil and optical axis of the lens of the left eye. In such case, the left eye is blanked out against seeing what the right eye is aiming at. The normal non-dominant right eye is then forced by the brain to act as the dominant eye for aiming. When the opaque alignment disk is located as just described, one of the self-adhering translucent disks is applied to the inside of the lens congruently with the opaque pupil alignment disk on the outside of the lens. The opaque disk is then removed and the translucent pupil blanking disk is retained on the glasses at least during the current shooting session.

An alternative form of alignment disk is also being made available. This alignment disk may be about the diameter of the translucent self-adhering disks but it has a central circular hole that is about the size of the average pupil or slightly larger. This perforated opaque alignment disk is placed on the outside of the lens in a manner similar to the manner in which the opaque disk described above is used. It is moved around on the outside of the lens while aiming until the object that is being sighted becomes clearly visible through the hole in the disk. Proper location of the disk can be checked by simply closing the right aiming eye and determining whether the target can be seen centered in the hole. If so, it would indicate that the center of the thin alignment disk or ring lies on the optical axis of the pupil and eye lens. As before, a self-adhering translucent disk is then applied on the inside of the lens coincident with the opaque disk and then the latter is peeled off for shooting.

A description of a preferred embodiment of the shooter's accuracy improving device and method will now be set forth in greater detail in reference to the drawing.

DESCRIPTION OF THE DRAWING

FIG. 1 is a plan diagrammatic view of a shooter who may have a dominant left eye but is compelled to aim a gun using the right eye or may simply be trying to aim with both eyes open;

FIG. 2 is a plan view of a kit constituting the device for mitigating the optical problems of a shooter;

FIG. 3 shows a pair of spectacles or glasses with a translucent blanking disk adhered to one of the lenses of the glasses;

FIG. 4 is a plan view of an alternative form of pupil alignment disk;

FIG. 5 is a section of a shooter's eye glass to which a thin opaque disk is applied in accordance with the new visual error correcting method disclosed herein;

FIG. 6 is similar to the preceding figure except that a translucent disk has been applied to the lens in addition to the opaque disk; and FIG. 7 shows the shooter's lens prepared for shooting wherein the opaque disk has been removed and the translucent disk remains on the lens.

DESCRIPTION OF A PREFERRED EMBODIMENT

Attention is first invited to FIG. 2 for a description of a kit constituting the shooter's aid. The components of the kit can be provided in a variety of arrangements but for the sake of example, the manner in which the kits are being sold commercially will be demonstrated in FIG. 2. The kit is composed of a pouch or envelope 10 which may be made of polyethylene or other suitable transparent plastic material. The pouch is desirably one that can be sealed and unsealed by pressing laterally extending ridges 11 on opposite sides of the envelope into and out of frictional engagement with each other as in commercially available "Zip Loc" pouches. Within the kit there is a sheet of material, such as paper card coated with a release agent, to which a plurality of the translucent disks 13 are adhered by means of pressure sensitive adhesive on the side that interfaces with the release coated paper 12. Four such translucent disks 13 are mounted to coated paper 12 as illustrative of what is done in one style that is presently being marketed. The disks 13 are composed of a flexible translucent material such as the material known by the trademark Mylar. The disks can be punched from any thin sheet of plastic flexible material to which a pressure sensitive adhesive, that is compatible with the material, can be applied. By way of example and not limitation, the disks are a few thousandths of an inch thick in a kit that is being marketed.

The kit illustrated in FIG. 2 contains one opaque pupil alignment disk 14 which has no adhesive on either side so it can be withdrawn easily from envelope 10. This disk has the same outside diameter as disks 13 in the illustrated embodiment although a slight variance would be permissible. In the product currently being sold, the disks 13 and 14 have an outside diameter of $\frac{3}{4}$ of an inch (19 mm). The disks do not have to be held to an extremely close tolerance because the pupils of human eyes are variable in diameter. No case has been heard of where a disk having a $\frac{3}{4}$ of an inch (19 mm) outside diameter is not satisfactory for aligning with the pupil and for blanking the optical axis of the pupil.

Attention is now invited to FIG. 1 which shows a diagram of a shooter who is holding a gun with a long barrel 15 such as a shotgun or a rifle. The stock 16 of the gun is on the right side of the shooter who is identified by the reference numeral 100. The butt 18 of the gun stock is bearing on the right shoulder area of the shooter. The shooter has his right naturally non-dominant eye 19 aligned through right lens 17 with the rear sight 20 and the front sight 21 of the gun barrel in this first example where the disks are used. The shooter is getting ready to perform the method of causing the task of sighting a distant object in line with the rear 20 and front 21 sights of the gun. It is assumed, of course, that the shooter is wearing spectacles or glasses for the purpose of correcting vision or is simply wearing safety glasses with plain lenses. Most individuals who shoot competitively will wear either corrected or uncorrected safety glasses for the sake of avoiding possible eye injury. This is a good practice for all shooters to follow. In FIG. 1, normally, that is without using the invention, the right non-dominant eye would be directed along a sight line 23 and the dominant left eye 22 would be directed along a sight line 24. Unless a blanking disk 13 is used to occlude the pupil of the left eye 22, the left eye will, under influence of the brain, tend to dominate the sighting process which, because of parallax is likely to result in an inaccurate aim. In accordance with the invention, the right eye 19 is kept open during aiming and shooting with the new vision correcting method. With both eyes open, the opaque alignment disk 14 is deposited randomly on left spectacle lens 26. This disk can be caused to adhere well enough to the lens by simply wetting the disk before it is applied. Then, the shooter or someone shooting in the same party will move the opaque alignment disk 14 around on the lens of the spectacles until the disk is aligned with the pupil of the left eye. This is the condition exhibited in FIGS. 1 and 5. During this time, both eyes have been held open. As indicated, opaque disk 14 is tentatively adhered by simply wetting it so it will adhere by surface tension and can be easily moved about on the outside surface of the spectacle lens. When the opaque alignment disk 14 is properly placed in alignment with the pupil of the left eye while the right eye continues to remain on target, one of the translucent disks 13 is released from carrier card 12 and applied on the inside of the spectacle lens 26 congruently or coincident with the opaque disk 14 as in FIG. 6. The opaque disk is then removed from the outside surface of the lens and the self-adhering translucent disk remains in place as in FIG. 7. After a shooting or hunting session, the translucent blanking disk can be peeled off easily from glass. It may be discarded or if not damaged, it may be reapplied to the release material coated card 12. If the spectacles are dedicated to shooting only, of course, the blanking disk can remain on the lens.

FIG. 3 shows one of the translucent blanking disks 13 located in the upper left quadrant of the left spectacle lens 26. This is usually the area in which the disk will be located finally in a case where the right eye is either dominant or compelled to be dominant for aiming the gun.

Safety glasses or spectacles and correction spectacles used by shooters are very often colored or tinted to reduce glare. Kits having different colored or tinted blanking disks 13 are provided. By way of example and not limitation, the shooter has the option of buying a kit or kits which have one of eight color or tint choices. Shooters, and of particular importance, trap shooters report that after wearing the blanking disk which matches the tint or color of their spectacle lenses for a short time, they become oblivious to the presence of the translucent disk although their depth perception, binocular vision and peripheral vision remain unimpaired. The brain quickly accommodates to the presence of the disk and it preserves physiological conditions in the eye that prevail in any healthy eye. For instance, the blood supply to the retina in both eyes remains constant when using the disk even though the disk is blanking out central vision. It is believed that the brain is tricked into maintaining normal conditions by reason of peripheral scattered light being allowed to enter through the pupil as is normal and also, of particular importance, by reason of some light passing through the translucent disk as prescribed herein. It is known that the vision centers in the brain can bring about eye adaptation under various unnatural conditions. Even during normal vision, the image that falls on the retina of the eyes is inverted but the brain effectuates an inversion that makes objects appear to be upright as they should be. It has been shown that if a subject is equipped with lenses that invert all objects that are viewed, the eye will for some time see eye everything as inverted. In time, however, the brain which inherently wants to record everything in an upright natural orientation brings about an interpretive inversion which causes everything to be perceived in the proper upright orientation. When the inverting lenses are removed, the brain responds by continuing to perform the inverting function but after a lapse of time, normal vision is restored.

The method of using the kit discussed above in reference to FIG. 1 involved a case where the shooter is left eye dominant and is compelled to aim the gun with the right eye. However, even when a shooter is right handed and right eye dominant and conveniently aims with the right eye as the shooter should, it has been shown to be desirable to aim and shoot with the non-dominant left eye open. In this case, the opaque alignment disk is used in the manner previously described to establish the proper location for blanking out the pupil and indicating where the translucent blanking disk 13 should be located on the shooter's spectacle lens. As was mentioned earlier, many shooters who are right eye dominant, right handed and shoot from the right side are not able to keep their left eye open during aiming and shooting because they have double vision under these circumstances. By blanking out the non-dominant left eye as previously described, the double vision disappears and the non-dominant eye can be left open during aiming and shooting. Experience has shown this to be the case and results show that accuracy is greatly improved.

An alternative form of alignment disk 114 is shown in FIG. 4. This disk is essentially the same as the opaque blanking disk 14 except that it has a central aperture 115. This aperture has a diameter that is close to the diameter of the average pupil in the human eye. The aligning disk 114 is used similarly to imperforate aligning disk 14 insofar as location is concerned. Some shooters may find that it is easier to properly position the perforated disk or ring 114 where the translucent disk is to be deposited congruently than by using the imperforate disk 14. One reason is that it is easy to check the proper location of the apertured disk by closing the eye on which the disk is not superimposed. If the field of vision is not cut off when looking in the direction in which the target is being sighted, the aperture 115 and, hence, the periphery of the disk 114 is properly located. If the rim of the disk surrounding the aperture lies across the line of sight when the other eye is closed, the disk simply has to be moved around until there is no shuttering of the disk across the line of sight to the open eye.

We claim:
1. A method of improving accuracy when shooting a weapon such as an arrow, a pistol, a rifle, a shotgun or the like while wearing glasses, comprising the steps of:
   sighting with the optical axis of one eye directed along the weapon as would be done when aiming at a target, applying an alignment disk comprised of an opaque material and approximating the size of the pupil of the other eye to one side of the lens of said glasses that is in front of said other eye and aligning said disk over said pupil on the optical axis of said other eye while continuing said sighting, adhering a blanking disk composed of translucent material on a side of said lens opposite of the side to which said alignment disk is applied and coincident with said alignment disk, and removing said alignment disk before shooting.

2. The method according to claim 1 wherein for a left handed shooter said alignment and blanking disk are applied to the right lens of said shooter's glasses and for a right handed shooter said alignment and blanking disks are applied to the left lens of said shooter's glasses.

3. The method according to any one of claims 1 or 2 wherein adhesive is used between said blanking disk and lens to hold said blanking disk on said lens after said alignment disk is removed.

4. The method according to any one of claims 1 or 2 including the step of wetting said alignment disk before applying it to said lens so said disk may be moved around on the surface of said lens but will stick tentatively to said lens.

5. The method according to any one of claims 1 or 2 wherein the lenses of said glasses are tinted and said translucent blanking disk adhered to said lens exhibits a tint that substantially matches said tint of said lenses.

6. The method according to claim 4 wherein said wetted alignment disk is applied randomly to said other lens and said disk is slid around on the surface of said lens to align with said pupil.

7. The method according to any one of claims 1 or 2 wherein said disk of opaque material has a central hole.

* * * * *